Patented Feb. 10, 1948

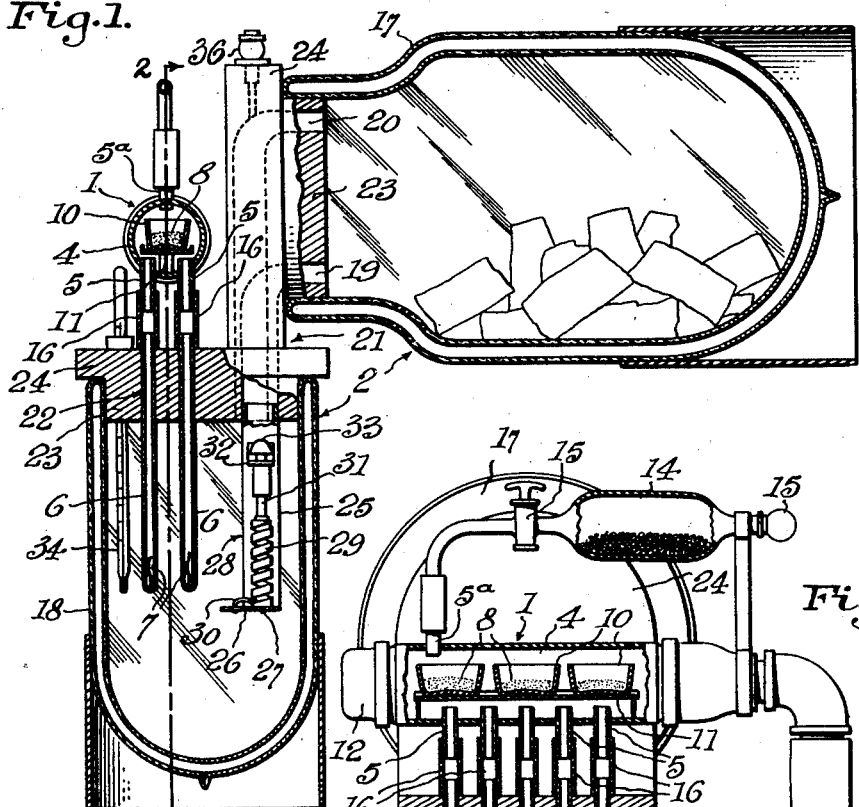
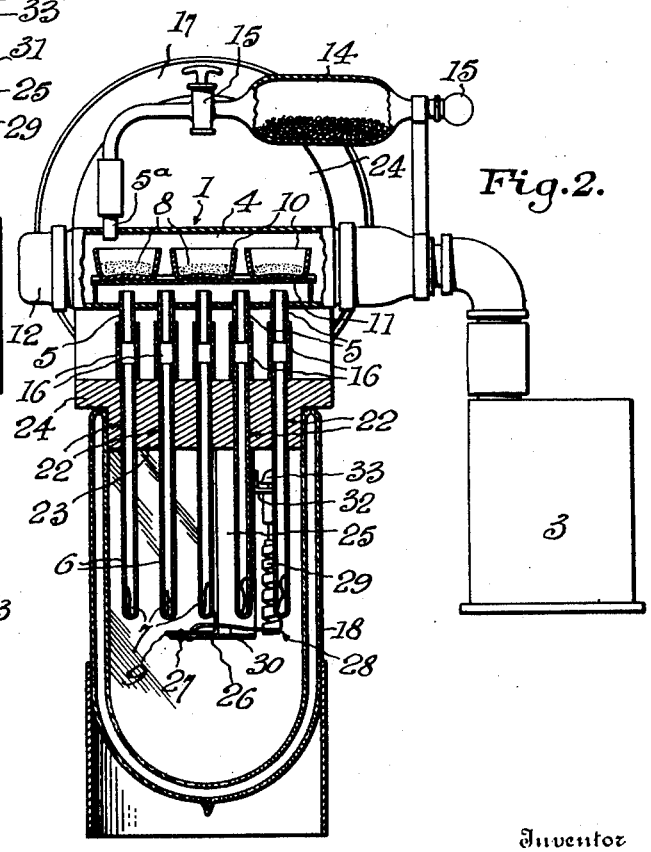
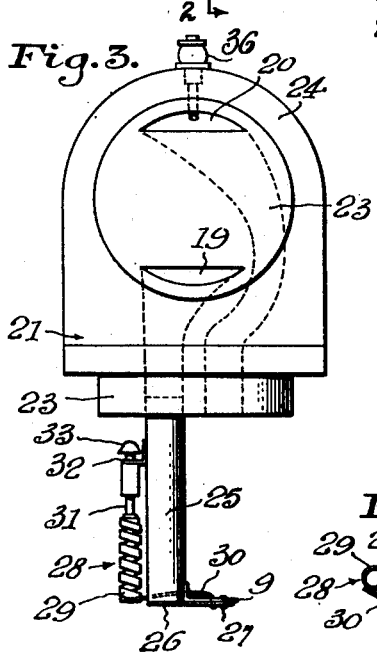

2,435,854

UNITED STATES PATENT OFFICE 2,435,854

APPARATUS FOR THE FREEZING-DRYING OF TISSUES

Albert Cecil Taylor, Chicago, Ill., assignor to the United States of America, as represented by the Secretary of War Application May 7, 1945, Serial No. 592,394

3 Claims. (Cl. 34—51)

This invention relates to methods and apparatus for the freezing-drying of tissues for storage and it is especially directed to a method of desiccating a tissue in a frozen state by employing a combined high vacuum and a low temperature apparatus.

In order to reduce to a minimum distortion of the cellular structure of tissues subjected to freezing-drying as well as chemical changes during the subsequent period of storage, three conditions are of prime importance, to wit: (1) to rapidly freeze the whole tissue, (2) to dehydrate as completely as possible, and (3) to maintain a low temperature during the dehydration process. The first two conditions set forth may be easily and economically accomplished by presently available commercial means. However, the subsequent process of dehydration in high vacuum at a low temperature and preferably a constant low temperature has presented many complex problems.

In the preservation of bacteria suspended in liquid, or fluids such as plasma, the cooling effect due to the evaporation within the evacuated tubes is sometimes depended on to maintain material contained therein in a frozen state, as disclosed by Flosdorf and Mudd, J. Immunol. 29: 389, 1935. However, in the case of dense tissues such as nerves with relatively low water content, evaporation is not sufficiently rapid to keep the temperature securely below the freezing point of the protoplasm and intercellular fluids. Especially is this true as dehydration progresses and the electrolytes of the tissue become more concentrated with a consequent lowering of their freezing point. For such tissues the highest temperature which dehydration may be carried on without too rapid growth of ice crystals is in the vicinity of −30° C., as was discovered by Simpson, Anat. Rec., vol. 80, p. 173, 1941. In more elaborate systems, such as those disclosed by Bensley and Gersh, Anat. Rec., vol. 57, p. 205, 1933; and of Hoerr, Anat. Rec., vol. 65, p. 293, 1936, cooling is effected by mechanical refrigeration units with coils in heavily insulated chambers. Although these systems have the advantage of being reliable and accurately adjustable, they are cumbersome and expensive.

It is an object of this invention, therefore, to provide an economical and efficient device for dehydrating tissue in a high vacuum at low temperature.

It is another object of this invention to provide a method of desiccating tissues in a high vacuum at a low temperature wherein tubes containing said tissues are easily accessible and may be sealed off without breaking the original vacuum.

It is another object of this invention to provide a method of producing dried tissues protected from any contact with atmospheric air and moisture.

It is a further object of this invention to provide an apparatus having a thermostatic control for maintaining a constant low temperature for dehydrating tissues in a high vacuum.

A still further object of this invention is to provide an apparatus of the class herein disclosed which will be inexpensive and simple in construction and efficient and durable in use.

The foregoing and other objects and advantages of this invention will be more apparent from reading the specification in conjunction with the drawings, forming a part thereof, wherein:

Fig. 1 is a detailed vertical cross sectional view of the device, parts shown in elevation;

Fig. 2 is a detailed vertical cross section taken along line 2—2 of Fig. 1, parts shown in elevation;

Fig. 3 is a back elevation of the cover and thermostatic control associated therewith; and, Fig. 4 is an end elevation of the cold gas vent with thermostat control connected thereto.

In the drawings, wherein like members are given the same reference numeral, the apparatus consists of two interconnected systems, a vacuum desiccating system 1 and a refrigerating system 2. The vacuum desiccating system comprises a high vacuum pump 3 which may be any suitable type of high vacuum pump used alone, but preferably a mercury diffusion pump is used in series therewith. This pump 3 is connected directly with a manifold 4 constructed of any suitable material, preferably galvanized iron pipe and suitable fittings. This manifold 4 is provided with a plurality of nipples 5 adapted to have connected thereto vials 6 containing the tissues 7 to be desiccated. Positionally opposite these nipples is another nipple 5a which serves as an air inlet or vacuum gauge connection in the event it is desired to use one. Since the movement of gases at very low pressures is retarded by long, small caliber channels, the vacuum system should be designed with the largest feasible inside diameter and shortest possible distances between the component parts.

To protect the pump 3 from moisture and to speed desiccation of the tissue 7, phosphorus pentoxide 8, or other suitable desiccating agent, is placed in the manifold 4 in any suitable manner; such as, dishes 10 supported on a removable tray 11. The tray 11 may be removed from the manifold 4 after unscrewing the manifold cap 12 which contains a closely fitting steel disk and rubber gasket, not shown, for hermetically sealing the end of the manifold when the cap 12 is threadedly engaged therewith.

Unless a gauge is to be used in the vacuum system, the nipple 5a adapted therefor is connected with a calcium chloride air dryer tube 14 having glass stopcocks 15 suitably positioned therein to control selectively the exclusion or flow of air. This tube serves as an air inlet whenever it becomes necessary to break the vacuum before sealing off the tissue vials; for instance, whenever it becomes necessary to recharge the manifold with fresh phosphorus pentoxide during a run.

Vials of any suitable material or dimensions may be suitably employed in this device. However, vials constructed from 10 mm. pyrex tubing in 20 centimeter links having an end thereof flame sealed have been found to be satisfactory. These vials are attached to the manifold nipples 5 by means of rubber pressure hose connections 16.

The cooling system of the apparatus of this invention employs solid carbon dioxide as a cooling agent. The cooling system comprises two thermos flasks 17 and 18 connected by convection vents 19 and 20. Preferably, these flasks are positioned substantially normal to each other with the respective open ends adjacent and normal to the longitudinal axis of the desiccator manifold 4 to present a compact device facilitating the flow of gases. The source-of-refrigerant flask 17 has a restricted opening to aid in retaining the solid carbon dioxide therein which is spaced from the convection vents 19 and 20. The flask 17 serves as a source of cold gas which is utilized in the refrigerating flask 18 for the refrigeration of the tissues. The gases in the first mentioned flask 17 are kept near the sublimation temperature of carbon dioxide by packing the flask with dry ice, whereas the temperature in the second mentioned flask 18 may be maintained at the desired level by controlling the convection current between the two flasks. The two flasks 17 and 18 are closed by a common cover 21 which contains the convection vents 19 and 20 as well as perforations 22 for the tissue vials 6. The cover 21 is prepared from any suitable heat insulating material, shaped to seal the open ends of the respective flasks 17 and 18 by having portions 23 extending therein and forming a sealed joint therewith and external sections 24 having portions of the gas vents 19 and 20 provided therein. The outside of the cover is provided with a gas impervious coating, several coats of shellac being satisfactory, to prevent the seepage of moisture into the system through the pores of the cover.

The cold gas vent 19 is extended downwardly into the refrigeration chamber 18 by a tube 25 attached to the cover 21. This tube 25 has a bracket 9 secured to its lower end, which bracket pivotally supports a thin metal damper valve 26. The valve 26 is mounted to swing freely on its pivot 27 to open and close the cold gas vent tube 25 automatically with temperature changes in the refrigeration flask 18. The damper valve 26 is actuated by a bimetallic thermostat 28.

The bimetallic thermostat 28 comprises a bimetallic helix 29 having one end secured to a lever 30 connected to the damper valve 26 and the other end thereof secured to a shaft 31 mounted on the cold gas vent tube 25 by means of an angle member 32. A control knob 33 is secured to the shaft 31 which may be turned to adjust the thermostat to close the valve at any chosen temperature thereby effecting a constant temperature control. This shaft is held in pre-set position by suitable friction means. Temperature representing indices may be placed upon the outwardly extending flange of the channel member 32 and a marker, in the form of a line, placed on the knob to indicate the temperature setting of the thermostat.

In operation, the cold gas mixture within the refrigerant flask 17 flows through the cold gas vent 19 and past the open damper valve 26 into the refrigeration flask 18 where it displaces the lighter, warmer gas it encounters there. This lighter gas rises to the top of the refrigerator flask 18 and is forced through the warm gas vent 20 back into the refrigerant flask 17 where it becomes cooled by contact with the gases and solid carbon dioxide therein. As the gas in the refrigeration flask 18 is cooled, the bimetallic helix is distorted so as to gradually close the damper valve 26 and retard the convection current until an equilibrium is established at the temperature for which the regulator knob 33 has been set. The vent 20 is shown as provided with a pressure-relief valve 36 of any suitable construction that is adapted to open under a predetermined pressure in the system.

In operation, tissues, prepared aseptically, are dropped directly into isopentane at a temperature of −50° C. and allowed to remain therein for approximately 10 seconds to completely freeze the tissue. Since it is important that the temperature of the frozen tissue be maintained below −40° C. until it has become completely dry, precautions against warming must be observed at each and every step of the process of transferring the tissue from the isopentane to the assembled refrigerating flask 18. Before removing the frozen tissue from the isopentane, the pyrex vials are sterilized and precooled with solid carbon dioxide. The frozen tissues are then removed from the isopentane with chilled forceps, and placed in the precooled vials; the open end of the vials are plugged with sterile cotton and placed in contact with solid carbon dioxide. After all the vials have been filled they are attached to the rubber pressure tube couplings 16 on the manifold nipples 5. This attachment must be done quickly and preferably with leather gloves cooled by contact with solid carbon dioxide. In order to keep previous attached vials cooled while others are being handled, a container of alcohol charged with solid carbon dioxide is positioned in a manner such that the attached vials are emersed in the liquid. When all vials are attached to the manifold, the cover is placed in position over them, and the refrigeration flask 18, which has previously been thoroughly cooled with solid carbon dioxide, is secured to its portion of the cover and a support placed thereunder. The refrigerant flask 17 is filled with solid carbon dioxide and positioned on its portion of the cover, and preferably cradle-suspended in this relationship. Convection currents begin to flow immediately. The desiccant dishes 10 are then filled with a desiccating agent, preferably phosphorus pentoxide, placed in the manifold 4, and the manifold cap 12 tightly screwed thereon. The vacuum pump or pumps 3 are started and evacuation continued until the desiccation of the tissue is completed.

During long runs, necessitated by dense tissues, it may become necessary to replenish the refrigerant, solid carbon dioxide. This may be done by simply sliding the refrigerant flask 17 back from the cover, refilling with solid carbon dioxide, and returning it to the cover. In so doing, one must guard against clogging the cold gas vent 19 in the cover with pieces of the solid carbon dioxide during this refilling or replenishing process.

It may likewise become necessary to replenish or replace the desiccating agent, prosphurus pentoxide, during a run, when there is an excessive amount of moisture content in the tissue to be desiccated. To do this, the vacuum must first be broken by opening the stopcocks 15 in the air inlet desiccator 14 so as to gradually admit air in the manifold 4. After the air ceases to enter the stopcocks 15, the manifold cap 12 may be unscrewed and the desiccant dishes 10 removed, refilled, inserted in the manifold, the manifold cap replaced on the manifold, and the stopcocks 15 closed.

Most of the moisture extractable is removable from the tissue within the first four days; however, it is advisable to allow the dehydration to continue for several days thereafter, particularly when the tissues are to be stored for long periods of time. With the low pressure constant, the time required for drying varies directly with the size of the tissue and the moisture content thereof.

As previously stated, the temperature within the refrigeration flask 18 may be regulated by adjusting the thermostat controlling the damper valve, variations of approximately 2° C. being permissible in this apparatus. If moisture is permitted to enter the cooling system through the pores of the cover, improper fit of the cover, or joint leakage, snow may form in the convection vents thus cutting down or shutting off the convection vents. Should this occur, the snow may be jarred loose by tapping the cold gas vent tube 25 or inserting a rod therein.

It should be noted that there is a temperature gradient from the bottom to the top of the refrigeration flask 18. Therefore, to determine the temperature of the tissues 7 in the vials 6, a thermometer 34 is inserted through the cover 20 and so positioned that the bulb of the thermometer is level with the tissue vials 6.

Upon completion of dehyhdration, the vials containing the tissue may be sealed off, either after filling with air through the desiccator, or while still evacuated. The refrigerant flask 17 must first be removed, and the cover 20 is then separated from the refrigeration flask 18. Then, with one vial at a time insulated from the rest by an asbestos sheet, the flame of an oyxgen hand torch is played upon the walls of the vial 6 at a point somewhat above the mid-point. When the glass is softened, the lower part which contains the tissue 7 is drawn away and sealed. If the tissue is to be sealed in vacuum, the pump 3 is left running while each vial, in turn, is shut off from the vacuum manifold by a screw clamp on the rubber connection 16. This is done as a precaution against the entrance of moist air into the whole system in the case of accidental perforation of the wall of the vial 6. Care must be exercised while sealing not to overheat the glass at any point, since, with tubing of this diameter, atmospheric pressure may easily force an opening through the softened glass.

Tissues sufficiently dehydrated and thus sealed in vacuo may then be stored at room temperature.

Having thus described my invention, what I claim as new and wish to secure by Letters Patent is:

1. An apparatus for desiccating tissues, comprising, a manifold, ducts connected to the manifold, a removable vacuum-tight cap secured to one end of said manifold, a high vacuum pump communicably connected to the other end of said manifold, a desiccating agent positioned in said manifold, vials containing tissues, pressure tubing fitted vacuum tight with said ducts and said vials, first and second containers positioned at different elevations, the first one of said containers adapted to function as a source of gases at low temperature, covers for said containers adapted to hermetically seal said containers, apertures provided in the cover of said second container the vials being hermetically sealed in said apertures, convection conduits extending through said covers and connecting said containers, and a thermostatically controlled valve adapted to control the flow of said low temperature gases in said convection conduits.

2. An apparatus for desiccating tissues, comprising a manifold, a removable vacuum-tight cap secured to one end of said manifold, a high vacuum pump communicably connected to the other end of said manifold, a desiccating agent removably positioned in said manifold, vials containing tissues connected to said manifold, pressure tubing fitted vacuum-tight to said manifold and said vials, air desiccating inlet means secured to said manifold, valves selectively excluding and controlling flow of air means through said air desiccating inlet to said manifold, a container for said vials, a gas impervious cover for said container retaining said vials and hermetically sealing said vials in said container, a source of gas at a temperature below −40° C., convection ducts connecting said source of gas with said container, a thermostatically controlled valve selectively controlling flow of said gas in said convection ducts.

3. An apparatus for desiccating tissues, comprising a manifold, a removable vacuum-tight cap secured to one end of said manifold, a high vacuum pump communicably connected to the other end of said manifold, a desiccating agent positioned in said manifold, vials containing tissues connected to the manifold, a container for said vials, means for supplying a refrigeration medium communicably connected with said container, a cover for said container forming an hermetic seal therewith, apertures provided in said cover and receiving said vials in hermetically sealed relationship, and pressure tubing fitted vacuum tight with said manifold and said vials.

ALBERT CECIL TAYLOR.

REFERENCES CITED

The following references are of record in the file of this patent:

UNITED STATES PATENTS

| Number | Name | Date |
|---|---|---|
| 1,832,473 | Payson et al. | Nov. 17, 1931 |
| 1,970,956 | Elser | Aug. 21, 1934 |
| 1,979,124 | Tival | Oct. 30, 1934 |
| 2,011,881 | Stewart | Aug. 20, 1935 |
| 2,199,815 | Flosdorf | May 7, 1940 |
| 2,388,134 | Flosdorf et al. | Oct. 30, 1945 |

FOREIGN PATENTS

| Number | Country | Date |
|---|---|---|
| 840,092 | France | Jan. 11, 1939 |

OTHER REFERENCES

"An Improved Method of Desiccation, with Some Applications to Biological Problems," by S. F. Shackell; American Journal Physiology 1909, 24, pages 325 to 340. (Copy available in Div. 49.)